(12) United States Patent
Akcin

(10) Patent No.: US 9,887,956 B2
(45) Date of Patent: Feb. 6, 2018

(54) REMOTE PURGE OF DNS CACHE

(71) Applicant: Microsoft Technology Licensing, LLC, Redmond, WA (US)

(72) Inventor: Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 14/685,459

(22) Filed: Apr. 13, 2015

(65) Prior Publication Data

US 2016/0301656 A1 Oct. 13, 2016

(51) Int. Cl.
*G06F 15/16* (2006.01)
*H04L 29/12* (2006.01)

(52) U.S. Cl.
CPC ...... *H04L 61/1511* (2013.01); *H04L 61/6009* (2013.01)

(58) Field of Classification Search
CPC .......................... H04L 61/1511; H04L 61/6009
USPC .................................................. 709/223, 245
See application file for complete search history.

(56) References Cited

U.S. PATENT DOCUMENTS

| 2006/0112176 A1* | 5/2006 | Liu | H04L 29/12066 709/245 |
| 2008/0189437 A1* | 8/2008 | Halley | H04L 12/14 709/245 |
| 2010/0106833 A1* | 4/2010 | Banerjee | H04L 29/12066 709/226 |
| 2010/0274970 A1* | 10/2010 | Treuhaft | H04L 29/12066 711/118 |
| 2013/0198269 A1* | 8/2013 | Fleischman | H04L 61/20 709/203 |
| 2015/0058488 A1* | 2/2015 | Backholm | H04L 61/1511 709/226 |
| 2015/0081926 A1 | 3/2015 | White et al. | |
| 2016/0219015 A1* | 7/2016 | Ruggeri | H04L 61/1511 |

OTHER PUBLICATIONS

"International Search Report and Written Opinion Issued in PCT Application No. PCT/US2016/026853", dated Sep. 20, 2016, 17 Pages.
Abley, et al. "A Mechansim for Remote Triggered DNS Cache Flushes (DNS FLUSH) draft-Jabley-dnsop-dns-flush-00", In the Proceedings of Standard Working Draft in Internet Society on Internet Engineering Task Force, Jun. 24, 2013, 12 Pages.

(Continued)

*Primary Examiner* — Philip B Tran
(74) *Attorney, Agent, or Firm* — Liang IP, PLLC

(57) ABSTRACT

Various techniques for purging resource records stored in a cache of domain name system servers are disclosed herein. In one embodiment, a method includes receiving, at a caching server, a DNS query via a computer network. In response to receiving the DNS query, the caching server determines if the received DNS query indicates a request to purge the one or more resource records stored in the DNS cache on the caching server. In response to determining that the received DNS query indicates a request to purge the one or more resource records stored in the DNS cache on the caching server, the caching server purges the one or more resource records from the DNS cache on the caching server.

20 Claims, 6 Drawing Sheets

(56) References Cited

OTHER PUBLICATIONS

"Frequently asked Questions—Public DNS-Google Developers", Retrieved From <<https://web.archive.org/web/20150315113740/https://developers.google.com/speed/public-dns/faq#update cache>>, Mar. 15, 2015, pp. 1-6.

"BIG-IP® Global Traffic Manager™: Implementations", Retrieved From <<https://support.f5.com/content/kb/en-us/products/big-ip_gtm/manuals/product/gtm-implementations-11-2-0/_jcr_content/pdfAttach/download/file.res/BIG-IP_Global_Traffic_Manager_Implementations.pdf>>, Feb. 3, 2014, 134 Pages.

* cited by examiner

REMOTE PURGE OF DNS CACHE

BACKGROUND

In a computer network such as the Internet, users can identify web servers, email servers, or other network resources by alphanumerical domain names. However, routers, switches, and other computer services or devices identify such resources by numerical IP addresses. A domain name system facilitates operations of the computer network by providing a translation service between the alphanumeric domain names and numerical IP addresses. For example, a domain name server can first translate the domain name "www.example.com" to the IP address "192.168.0.1." Routers, switches, or other computer services or devices can then access network resources associated with this domain name based on the translated IP address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A domain name system ("DNS") typically includes authoritative servers and caching servers. The authoritative servers are configured to return specific domain name translations (or "resource records") in response to DNS queries from caching servers. Caching servers are configured to retrieve such resource records from one or more authoritative servers and store (or "cache") the retrieved resource records for a period specified by a time-to-live value. Prior to expiration of the time-to-live period, the caching servers can provide copies of the cached resource records to client devices upon request without repeatedly retrieving the resource records from the authoritative servers. The caching servers, however, typically do not provide capabilities for easily purging the stored resource records.

The lack of purging capabilities of caching servers may cause difficulties in timely recovering from domain hijacking or other types of network attacks. For example, a malicious party can make an unauthorized modification of resource records in an authoritative server to redirect web requests to a fraudulent server configured for phishing or other illicit activities. Subsequent to the unauthorized modification, the caching servers retrieve the erroneous resource records from the authoritative server and store them for a time-to-live period. Thus, even after the erroneous resource records are corrected in the authoritative server upon discovery of the domain hijack, the caching servers may still cause web requests be directed to the fraudulent server for a considerable period of time.

Several embodiments of the disclosed technology can enable any device to purge a part or all of stored resource records on a caching server by submitting a certain type of DNS query to the caching server. In certain embodiments, in response to such a DNS query, the caching server may purge all of the stored resource records from its DNS cache. Such a purging technique allows for an increase of efficiency in recovery from a malicious attack on servers, or an increase of efficiency and/or performance in recovery from incorrect data on a caching server. In particular embodiments, the caching server can also request an updated copy of the purged resource records from one or more authoritative servers subsequent to purging. In further embodiments, the caching server may be configured to reject the requested purge based on certain conditions. In yet further embodiments, the caching server may be configured to allow purging of resource records of certain types, related to certain domains or zones, and/or having other suitable characteristics.

DETAILED DESCRIPTION

Figure 1:
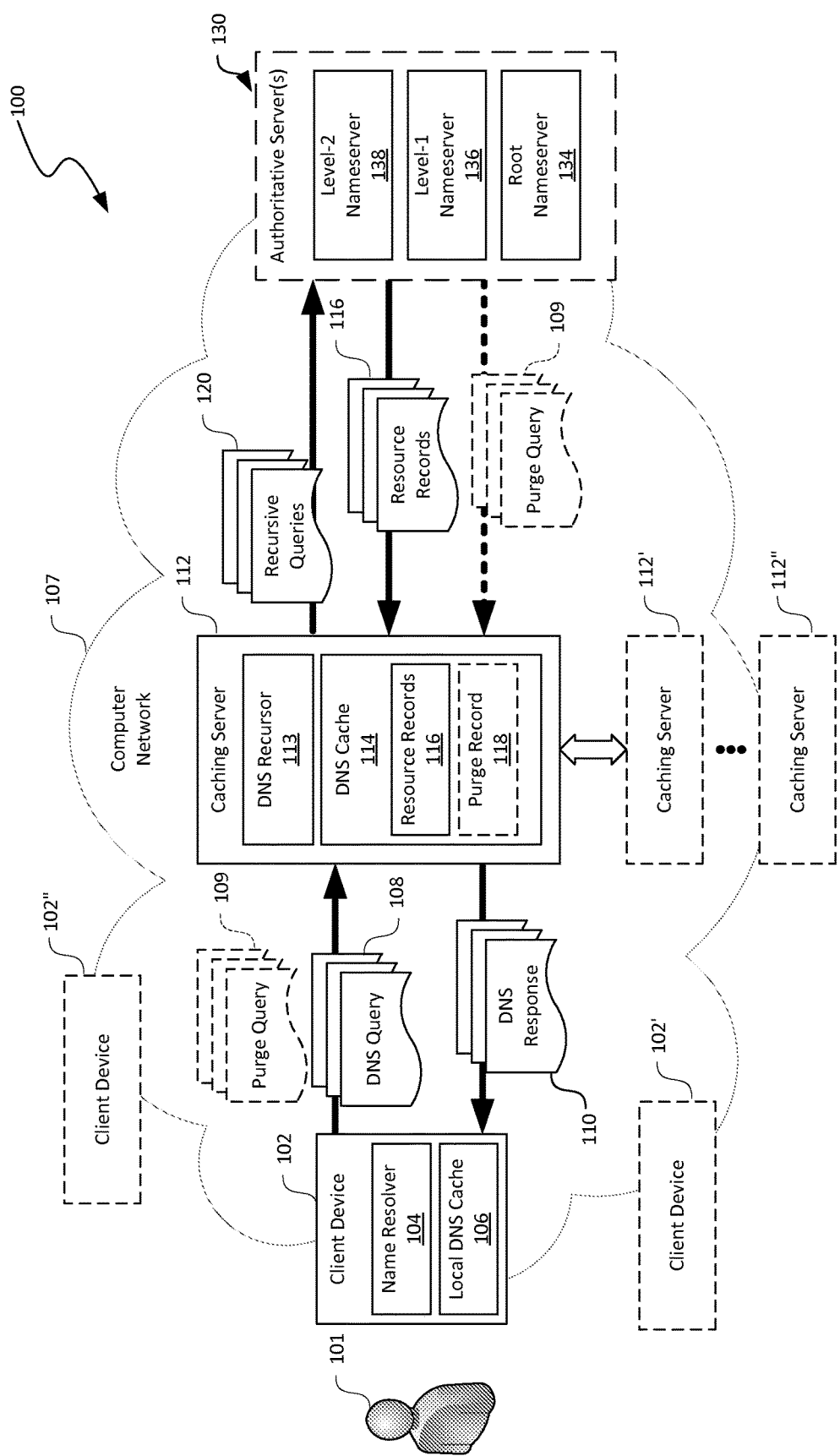
FIG. 1 is a schematic diagram illustrating a computing framework having a caching server configured to allow purging of cached resource records in response to certain DNS queries in accordance with embodiments of the disclosed technology.

Certain embodiments of systems, devices, components, modules, routines, and processes for purging cached resource records from caching servers are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, the term "domain name system" or "DNS" generally refers to a computer system configured to translate alphanumerical domain names into numerical IP addresses that are used by routers, switches, and/or other suitable network components to direct communications traffic in a computer network. A domain name system can include one or more operatively coupled DNS servers containing a database of domain name translations. Example DNS servers can include authoritative servers and caching servers, as described in more detail below.

An "authoritative server" generally refers to a DNS server specifically configured to return authoritative domain name translations in response to DNS queries for particular domains. For example, an authoritative server may contain a mapping of an uniform resource identifier ("URL") of a domain to an IP address specifically defined by a domain administrator. In another example, an authoritative server may contain a mapping of a host portion of an email address (e.g., "@gmail.com") to an IP address. Authoritative servers for a domain or host may be provided by DNS hosting companies, such as, for example, Amazon, Godaddy, and Verisign.

A "caching server" generally refers to a DNS server configured to recursively resolve a domain name of a target domain by querying one or more authoritative servers. For instance, each part of a URL like "www.example.com" has a specific DNS server (or group of servers) that is authoritative. At the top are the root domain servers containing IP addresses of authoritative servers that handle DNS queries for top level domains such as ".com". A caching server first queries the root domain servers for an IP address of an authoritative server for the ".com" domain. Then, the caching server queries the authoritative server for the ".com" domain for an authoritative server for the "example.com" domain. The caching server can then query the authoritative server for the "example.com" domain for an IP address associated with the target domain name.

The caching server can also cache the resolved domain names as a resource record for a period of time. The caching server can also be configured to return a copy of the stored resource record to a client device in response to a DNS query for the domain name from the client device. The resource record can include data of an alphanumerical domain name (e.g., www.example.com), a numerical IP address (e.g., 192.168.0.1), a time-to-live value, and/or other suitable types of data.

Also used herein, the term a "DNS query" generally refers to an electronic data package representing a request from, e.g., a client device to a DNS server for retrieving resource records from and/or performing other operations on the DNS server. For example, an A-type DNS query is a request for retrieving a 32-bit IPv4 address of a target domain name. An AAAA-type DNS query is a request for retrieving a 128-bit IPv6 address of a target domain name. Several embodiments of the disclosed technology are related to purging queries to caching servers that can result in purging a part or all of cached resource records on the caching servers. An example data structure suitable for a DNS query of DNS response is discussed below with reference to FIG. 6.

FIG. 1 is a schematic diagram illustrating a computing framework 100 having a caching server configured to allow purging of cached resource records in response to certain DNS queries in accordance with embodiments of the disclosed technology. As shown in FIG. 1, the computing framework 100 can include a client device 102, a caching server 112, and one or more authoritative servers 130 interconnected by a computer network 107. The computer network 107 can include the Internet, a local area network, a metropolitan area network, a wide area network, and/or other suitable types of network.

The client device 102, the caching server 112, and the authoritative servers 130 can each include a processor and memory (not shown) containing instructions for execution by the processor to provide certain software components discussed in more detail below. Even though particular components of the computing framework 100 are shown in FIG. 1, in other embodiments, the computing framework 100 can also include additional and/or different components. For example, the computing framework 100 can include additional caching servers 112' and 112", additional client devices 102' and 102", and/or other suitable components.

The client device 102 can include a desktop, a laptop, a tablet, a smartphone, and/or other suitable types of computing device. For example, the client device 102 can be an iPhone or iPad provided by Apple, Inc. of Cupertino, Calif., an Android device, a Chromebook device, a Windows device, or any other suitable devices. As shown in FIG. 1, in the illustrated embodiment, the client device 102 can include a name resolver 104 and a local DNS cache 106. In other embodiments, the client device 102 may also include other suitable hardware and/or software components. The name resolver 104 can be configured to determine a network address (e.g., an IP address) associated with a domain name (e.g., "www.example.com"). The name resolver 104 may be a part of an operating system or an application executing on the client device 102.

The local DNS cache 106 can be configured to store resource records of previously resolved domain names. In one embodiment, the name resolver 104 can determine a network address (e.g., an IP address) by accessing a resource record stored in the local DNS cache 106. In other embodiments, when a resource record does not exist in the local DNS cache 106, the name resolver 104 can query the caching server 112 for the desired resource record by, for example, transmitting a DNS query 108 to the caching server 112 and receiving a DNS response 110 from the caching server 112.

The authoritative servers 130 can include a plurality of DNS servers arranged in a hierarchy. For example, as shown in FIG. 1, the authoritative servers 130 can include a root nameserver 134, a level-1 nameserver 136, and a level-2 nameserver 138 arranged in a hierarchical manner. Even though a three-level hierarchy of DNS servers is shown in FIG. 1, in other embodiments, the authoritative servers 130 can include one, two, four, or any other suitable number of levels and/or servers.

In the hierarchy of the authoritative servers 130, each lower level servers can contain network addresses of upper level servers, and the top level server can contain a resource record that fully resolves a domain name. For example, the root nameserver 134 can contain a record of an IP address (e.g., 198.41.0.4) for the level-1 nameserver 136 corresponding to, e.g., a top level domain such as ".com". The level-1 nameserver 136 in turn can include a record of an IP address (e.g., 204.74.112.1) for the level-2 nameserver 138 corresponding to a lower level domain such as "example.com." The level-2 nameserver 138 can then include a record of an IP address (e.g., 192.168.0.1) that corresponds to the domain name "www.example.com."

As shown in FIG. 1, the caching server 112 includes a DNS recursor 113 operatively coupled to a DNS cache 114. The DNS recursor 113 can be configured to recursively resolve a domain name of a target domain by recursively transmitting queries 120 to and receiving resource records 116 from the one or more authoritative servers 130. The DNS cache 114 can be configured to store any resource records 116 previously resolved by the DNS recursor 113 for a period of time, for example, as specified by a time-to-live value. In certain embodiments, a value of the time-to-live period can be set by one or more of the authoritative servers 130. In other embodiments, the time-to-live value may be set by an administrator, an application, or other suitable entities.

The caching server 112 can be configured to return a copy of the cached resource records 116 as a DNS response 110 in response to a DNS query 108 from the client device 102. In one embodiment, the caching server 112 can determine if a resource record 116 corresponding to a domain name already exists in the DNS cache 114. If the resource record 116 already exists in the DNS cache 114, the caching server 112 transmits a copy of the resource record 116 as a DNS response 110 to the client device 102 via the computer network 107. If a resource record 116 does not exist in the DNS cache 114, the caching server 112 can invoke the DNS recursor 113 to retrieve a copy of the resource record 116 from the authoritative servers 130.

Further, the caching server 112 can be configured to purge a part or all of the cached resource records 116 in response to a DNS query 108 requesting such a purge from the client device 102 (referred to as a purge query 109 hereafter). In one embodiment, the caching server 112 can be configured to unconditionally purge all cached resource records in the DNS cache 114 in response to a purge query 109. In other embodiments, the caching server 112 may purge the resource records 116 conditionally. For example, the caching server 112 can optionally include a purge record 118 (shown in phantom lines for clarity) in the DNS cache 114.

In certain embodiments, the optional purge record 118 can be configured to specify any one or more of the following:
  Whether purging of the DNS cache 114 is enabled on the caching server 112;
  Which type(s) of resource records (e.g., A, AAAA, MX, NS, etc.) may be purged from the DNS cache 114;
  Security conditions and/or measures (e.g., MD5 message-digest algorithm hashing) before allowing purging of the resource records 116;
  Domains or zones whose resource records 116 are allowed to be purged;
  A frequency of purging allowed (e.g., upon request, once a day, once a week, etc.); or
  IP addresses or other identifications of client device(s) 102 that are allowed to purge the resource records from the DNS cache.

Similarly, in certain embodiments, the DNS query 108 can associate and/or inter-operate with the configured options on the caching server 112. In certain embodiments, the DNS query 108 can contain a name, a class, whether or not the query 108 is recursive, and one or more flags/parameters to identify details of a purge. For example, to purge certain type(s) of resource records (e.g., A, AAAA, MX, NS, etc.) from the DNS cache 114, an example DNS query 108 can include:
  Name: Domain name to be purged from DNS cache 114
  Flag parameter 1: Query
  Flag parameter 2: Purge operation
  Flag parameter 3: Type of resource records 116 to be purged
  Flag parameter 4: Recursive/Non-recursive flag In another example, to purge resource records 116 and provide security (e.g., MD5 message-digest algorithm hash), an example DNS query 108 can include:
  Name: Domain name to be purged from DNS cache 114
  Flag parameter 1: Query
  Flag parameter 2: Purge operation
  Flag parameter 3: Security credential In yet another example, to specify domains or zones whose resource records 116 are to be purged, an example DNS query 108 can include:
  Name: Domain name(s) that include zone(s) to be purged
  Flag parameter 1: Query
  Flag parameter 2: Purge operation
  Flag parameter 3: Zone(s) to be purged In a further example, to specify a frequency of purging (e.g., upon request, once a day, once a week, etc.), an example DNS query 108 can include:
  Name: Domain name(s) that include zone(s) to be purged
  Flag parameter 1: Query
  Flag parameter 2: Purge operation
  Flag parameter 3: Time increment for purge
  Flag parameter 4: Time unit (e.g., second, minute, week, month, etc.)

In other embodiments, the DNS query 108 can contain other suitable parameters, arguments, and/or flags.

In further embodiments, the purge record 118 can also contain records of any associated caching servers (e.g., caching servers 112' and 112"). In response to receiving a purge query 109, the caching server 112 may be configured to automatically forward a purge query 109 to each of the associated caching servers 112' and 112". In turn, the associated caching servers 112' and 112" may then purge cached resource records in respective DNS caches (not shown). In further embodiments, the purge record 118 can also be configured to specify a time-to-live associated with the purge record 118, purging overrides, and/or other suitable parameters.

During a purge operation, the user 101 may utilize the client device 102 to submit a request to purge a part or all of the cached resource records 116 in the DNS cache 114 of the caching server 112. In one embodiment, the user 101 can submit the request by invoking a command in, for example, in a web browser executing on the client device 102. In other embodiments, the user 101 may submit the request via a graphical user interface, a command-line interface, or other suitable interfaces on the client device 102. In further embodiments, the client device 102 can automatically generate a new request to purge based on an elapsed time, expiration of a cookie, a status of the local DNS cache 106, or other suitable parameters.

Upon receiving the submitted purge query 109, the client device 102 can construct a purge query 109 configured to indicate that a desired operation is to purge the DNS cache 114 on the caching sever 112. In one embodiment, the constructed purge query 109 may have a different structure than other DNS queries 108 such as those for resource records 116 and/or for performing other operations. In other embodiments, the purge query 109 may have generally similar structures as other DNS queries 108 but with different operation codes and/or other suitable parameters, as described below with reference to FIG. 6.

The client device 102 can then transmit the constructed purge query 109 to the caching server 112 via the computer network 107. In one embodiment, the client device 102 can identify a particular caching server 112 as the target for receiving the purge query 109. In other embodiments, the client device 102 can allow other network components (e.g., routers, switches, load balancers, etc.) to identify a suitable caching server 112. In further embodiments, the caching server 112 may be identified in other suitable manners. In any of the foregoing embodiments, the client device 102 can optionally be configured to purge the local DNS cache 106 prior to, subsequent to, or otherwise in conjunction with transmitting the purge query 109.

Upon receiving the purge query 109, the caching server 112 can determine that the desired operation is to purge cached resource records 116 from the DNS cache 114 by, for example, inspecting operation codes (e.g., arguments, parameters, or flags) included in the purge query 109. In one embodiment, the caching server 112 can then unconditionally purge all of the cached resource records 116 from the DNS cache 114. In certain embodiments, subsequent to purging, the caching server 112 can also invoke the DNS recursor 113 to obtain a new copy of the purged resource records 116 from the authoritative servers 130. The new copy of the resource records 116 can then be stored in the DNS cache 114. In further embodiments, the caching server 112 can also generate and transmit a DNS response 110 to the client device 102 reporting a successful completion of the purge.

In another embodiment, upon determining that the desired operation is to purge cached resource records 116 from the DNS cache 114, the caching server 112 determines if the requested purging is enabled based on, for example, the optional purge record 118. If purging is enabled, the caching server 112 can conditionally or unconditionally purge the cached resource records as discussed above. Otherwise, the caching server 112 may reject the purge query 109, and optionally generate and transmit a DNS response 110 indicating to the client device 102 that the requested purging operation is rejected.

In yet another embodiment, the purge query 109 can specify one or more desired types (e.g., A, AAAA, MX, NS, etc.) of the resource records 116 and/or one or more domains or zones whose resource records 116 are to be purged. These options may, for example, be specified by one or more operation codes associated with the purge query 109. In response, the caching server 112 may only purge resource records 116 of the desired types and/or associated with the one or more domains or zones from the DNS cache 114. In another embodiment, the purge query 109 may also specify one or more domains or zones that are to be purged. In a further embodiment, the purge query 109 can also contain one or more security credentials (e.g., MD5 message-digest algorithm hash code). The caching server 112 can check an included security credential by, for example, comparing the MD5 hash code with another hash code, before allowing any of the stored resource records 116 to be purged from the DNS cache 114. In further embodiments, the foregoing purging techniques may be combined in any suitable manners, or may also include additional procedures, examples of which are described in more detail below with reference to FIGS. 2-5.

As shown in FIG. 1, in certain implementations, one or more of the authoritative servers 130 can also be configured to construct and transmit a purge query 109 to one or more of the caching servers 112, 112', and 112". For example, in one embodiment, the level-2 nameserver 138 can detect a change to one or more resource records 116 stored therein. The level-2 nameserver 138 can then determine a list of caching servers 112, 112', and 112" that have accessed at least one of the changed resource records 116 over an elapsed period of time. The level-2 nameserver 138 can then construct and transmit a purge query 109 to each of caching servers 112, 112', and 112" for purging the DNS cache 114. In other embodiments, an administrator may instruct one of the authoritative servers 130 to construct and transmit a purge query 109 to one or more of the caching servers 112, 112', and 112".

Several embodiments of the disclosed technology can allow ready recovery from a domain hijacking or other types of computer network attacks. For example, in one embodiment, once a domain hijacking attack is discovered, false resource records 116 in the authoritative servers 130 can be corrected. Subsequently, any client devices 102 can send a purge query 109 to the caching servers 112, 112', and 112" to flush, remove, refresh, and/or otherwise purge resource records 116 related to the domain hijacking attack. In other embodiments, the authoritative servers 130 can transmit the purge query 109 to any caching server 112 that has requested the affected resource records before. As such, the resource records 116 in the DNS cache 114 of the caching servers 112, 112', and 112" can be readily corrected prior to expiration of the time-to-live periods related to the individual resource records 116.

Figure 2:
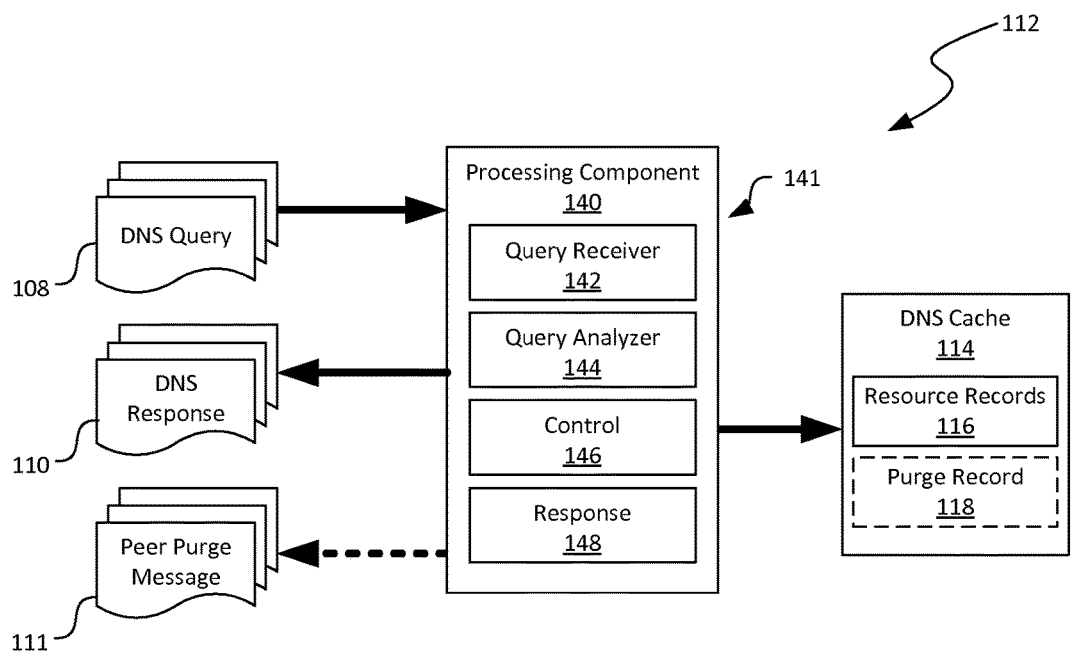
FIG. 2 is a block diagram showing software modules suitable for the caching server of FIG. 1 and in accordance with embodiments of the disclosed technology.

FIG. 2 is a block diagram showing software modules 141 suitable for the caching server 112 of FIG. 1 and in accordance with embodiments of the disclosed technology. In FIG. 2 and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Various implementations of the source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the caching server 112 can include a processing component 140 coupled to the DNS cache 114. The DNS cache 114 can contain the cached resource records 116, the optional purge record 118, and/or other suitable data. The processing component 140 can include a plurality of software modules 141 configured to facilitate purging a part or all of the resource records 116 from the DNS cache 114. As shown in FIG. 2, the software modules 141 include a query receiver module 142, a query analyzer module 144, a control module 146, and a response module 148 operatively coupled to one another. In one embodiment, all of the software modules 141 can reside on a single computing device (e.g., a network server). In other embodiments, the software modules 141 can also reside on a plurality of distinct computing devices. In further embodiments, the software modules 141 may also include interface modules, input/output modules, and/or other suitable modules (not shown).

The query receiver module 142 is configured to receive a DNS query 108 from a client device 102 (FIG. 1) or from one of the authoritative servers 130 (FIG. 1) via the computer network 107. Upon receiving a DNS query 108, the query receiver module 142 is configured to communicate the received DNS query 108 to the query analyzer module 144. The query analyzer module 144 can be configured to parse the received DNS query 108 and determine at least one of (1) a type of data requested or (2) a type of operation requested. For example, the query analyzer module 144 may determine that the received DNS query 108 requests an IP address associated with a particular domain name, or an operation to purge the stored resource records 116 from the DNS cache 114. The query analyzer module 144 can then communicate the analysis results to the control module 146.

The control module 146 can be configured to perform requested operations based on the analysis results from the query analyzer module 144. For example, in one embodiment, if the analysis results indicate that a purge operation is requested, the control module 146 can be configured to unconditionally purge a part or all of the cached resource records 116 from the DNS cache 114. In other embodiments, the control module 146 can also be configured to conditionally purge a part or all of the cached resource records 116 from the DNS cache 114, as described above with reference to FIG. 1.

The response module 148 is configured to generate and transmit a DNS response 110 to the client device 102. For example, in one embodiment, the response module 148 can be configured to generate a DNS response 110 indicating a success, failure, error, or other suitable status of the requested purge. In other embodiments, the control module 146 can also be configured to instruct the response module 148 to generate and transmit one or more peer purge messages 111 to other caching servers 112' and 112" (FIG. 1) for requesting purging resource records 116 from respective DNS caches thereon. Example operations of the software modules 141 are described in more detail below with reference to FIGS. 3-5.

Figure 3:
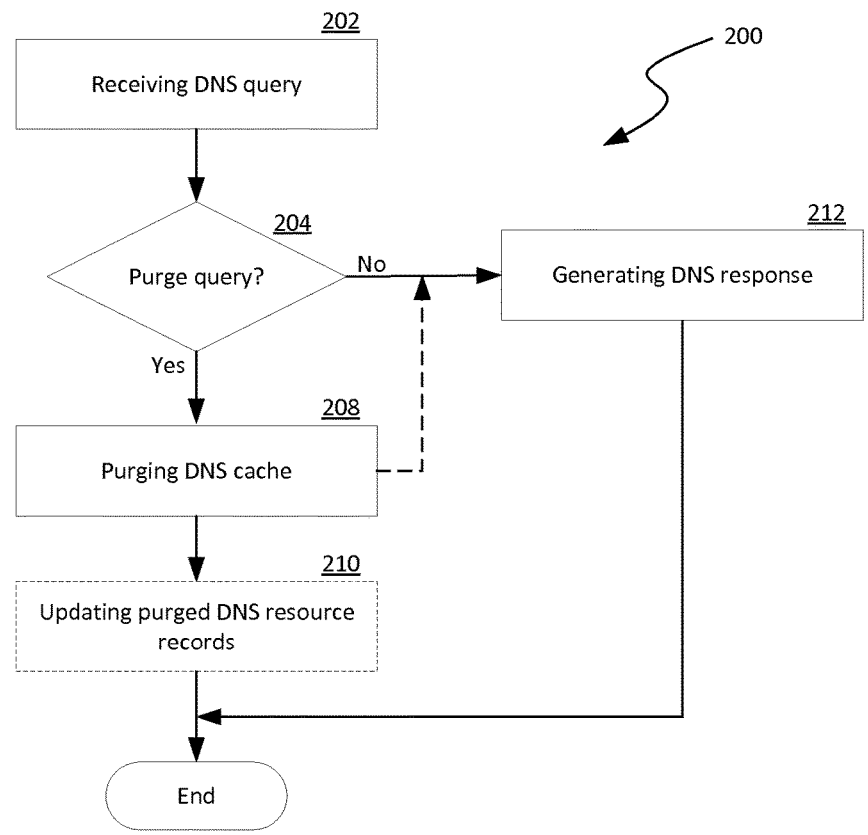
FIG. 3 is a flow diagram illustrating embodiments of a process of purging stored resource records on a caching server in accordance with embodiments of the disclosed technology.

FIG. 3 is a flow diagram illustrating embodiments of a process 200 of purging cached resource records on a caching server in accordance with embodiments of the disclosed technology. Even though various embodiments of the process 200 are described below with reference to the computing framework 100 of FIG. 1 and the software modules 141 of FIG. 2, in other embodiments, the process 200 may be performed with other suitable types of computing frameworks, systems, components, or modules.

As shown in FIG. 3, the process 200 can include receiving, at the caching server, a DNS query at stage 202, for example, by utilizing the query receiver module 142 (FIG. 2). The process 200 can then include determining if the received DNS query is a purge query at stage 204, for example, by utilizing the query analyzer module 144 (FIG. 2). If the DNS query is determined to be not a purge query, the process 200 includes generating a DNS response at stage 212, for example, by utilizing the response module 148 (FIG. 2). In one embodiment, the generated DNS response can include data of an IP address corresponding to a domain name. In another embodiment, the generated DNS response can include data of authoritative information for a zone. In other embodiments, the generated DNS response can also include a signature, address prefix, certification authority authorization, and/or other suitable type of information.

If the DNS query is determined to be a purge query, the process 200 includes purging a part or all of the cached resource records 116 (FIG. 2) from the DNS cache 114 (FIG. 2) at stage 208, for example, by utilizing the control module 146 (FIG. 2). In one embodiment, all of the cached resource records 116 can be purged from the DNS cache 114 unconditionally by, for example, marking memory locations of the cached resource records 116 to be rewritable or otherwise indicating that the memory locations contain non-usable data. In other embodiments, each of the cached resource records 116 may be checked against a current version from one or more authoritative servers 130 (FIG. 1) before purging, as described in more detail below with reference to FIG. 4. In further embodiments, a part or all of the cached resource records 116 can be purged conditionally. Examples of conditional purging are described in more detail below with reference to FIG. 5.

In certain embodiments, the process 200 can optionally include generating a DNS response subsequent to purging the DNS cache at stage 212. The generated DNS response can be configured to report either a success or failure of the purging the DNS cache 114. Also, the process 200 can also optionally include updating any or all of the purged resource records 116 at stage 210, for example, by utilizing the recursor 113 (FIG. 1) to recursively resolve a domain name whose corresponding resource record 116 has been purged. In other embodiments, updating the purged DNS resource records 116 may be omitted.

Figure 4:
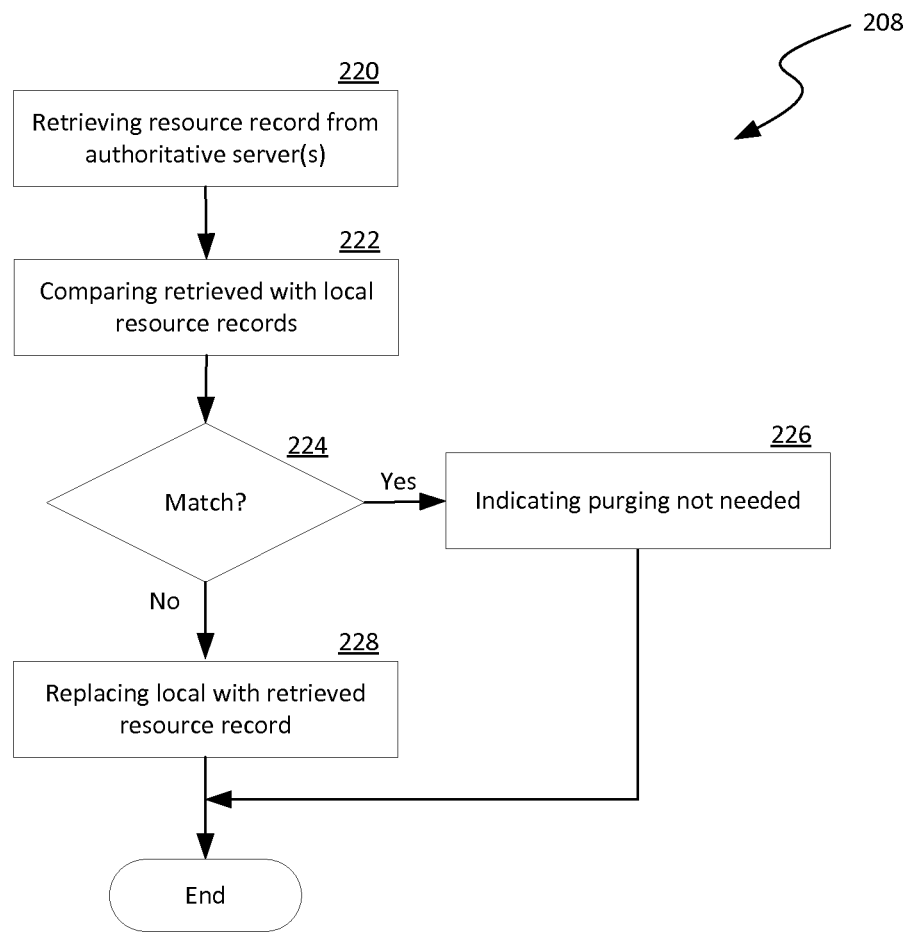
FIG. 4 is a flow diagram illustrating further embodiments of a process of purging stored resource records on a caching server in accordance with embodiments of the disclosed technology.

FIG. 4 is a flow diagram illustrating further embodiments of a process 208 of purging cached resource records from a DNS cache of a caching server in accordance with embodiments of the disclosed technology. As shown in FIG. 4, the process 208 includes retrieving a resource record 116 (FIG. 1) from one or more authoritative servers 130 (FIG. 1) based on a purge query at stage 220. In one embodiment, the retrieved resource record 116 includes a start of authority (SOA) record. An example of a SOA record is shown below:
ns1.dnsimple.com admin.dnsimple.com 2013022001 86400 7200 604800 300

As shown above, the SOA record can include the following parameters:
A primary name server for a domain (i.e., "ns1.dnsimple.com");
A responsible party for the domain (i.e., "admin.dnsimple.com").
A timestamp when the domain is updated (i.e., "2013022001");
A number of seconds before a zone should be refreshed (i.e., "86400");
A number of seconds before a failed refresh should be retried (i.e., "7200");
An upper limit in seconds before a zone is considered no longer authoritative (i.e., "604800");
A negative result time-to-life period (i.e., "300").

In other embodiments, the retrieved DNS record can also include name server, responsible person, or other suitable types of records.

The process 208 then includes comparing the retrieved resource record 116 with a local resource record 116 contained in the DNS cache 114 at stage 222 and determine if the retrieved resource record 116 matches the local resource record 116 at stage 224. In certain embodiments, the retrieved and local resource records can include SOA records, and comparing the retrieved and local resource records can include comparing at least one of the parameters of the SOA records listed above. In other embodiments, the retrieved and local resource records can include other suitable types of DNS data that can be compared in other suitable manners. If the retrieved resource record 116 matches the local resource record 116, the process 208 includes indicating that purging is not needed (or is completed) at stage 226. If the retrieved resource record 116 does not match the local resource record 116, the process 208 includes replacing the local resource record 116 with the retrieved resource record 116 at stage 228.

Figure 5:
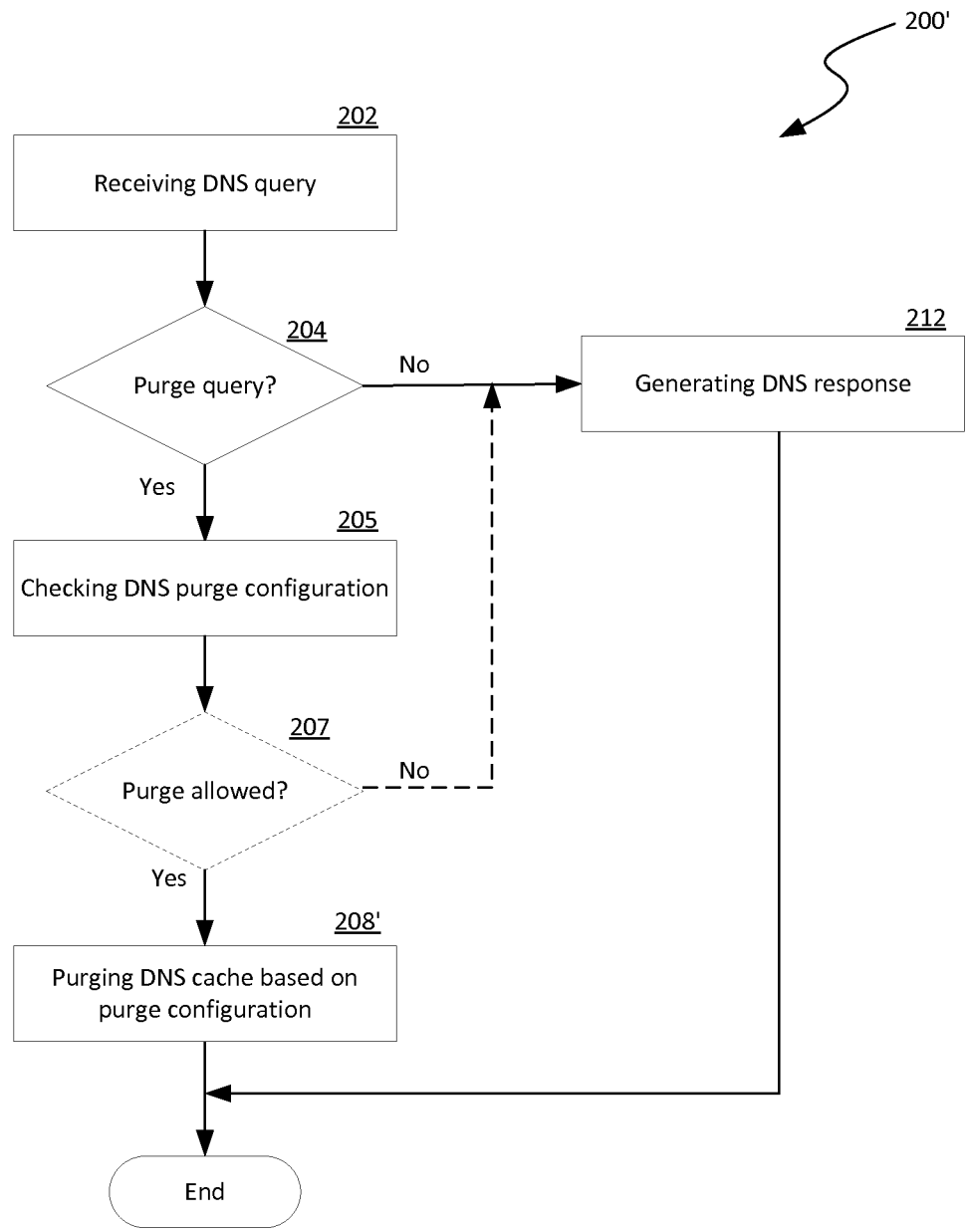
FIG. 5 is a flow diagram illustrating yet further embodiments of a process of conditional purging stored resource records from a DNS cache of a caching server in accordance with embodiments of the disclosed technology.

FIG. 5 is a flow diagram illustrating yet further embodiments of a process 200' of conditional purging cached resource records from a DNS cache of a caching server in accordance with embodiments of the disclosed technology. Certain operations of the process 200' can be generally analogous to the process 200 described above with reference to FIG. 3. As such, similar operations are identified by similar numbers. Details of such similar operations are not repeated here for succinctness.

As shown in FIG. 5, the process 200' includes receiving a DNS query at stage 202. The process 200' can then include determining if the received DNS query is a purge query at stage 204. If the received DNS query is not a purge query, the process 200' includes generating a DNS response to the DNS query at stage 212. If the received DNS query is a purge query, the process 200' includes checking DNS purge configuration at stage 205. In one embodiment, checking the DNS purge configuration can include locating a purge record 118 (FIG. 1) in the DNS cache 114 (FIG. 1) of the caching server. Various embodiments of the purge record 118 are described above with reference to FIG. 1. In other embodiments, checking the DNS purge configuration can also include retrieving suitable local DNS settings from the caching server 112 or other suitable operations.

In certain embodiments, the process 200' can optionally include determining if a purge of the DNS cache 114 is allowed at stage 207. If a purge of the DNS cache 114 is not allowed, the process 200' can optionally include generating a DNS response at stage 212 indicating that the received purge query is rejected or a purge is otherwise not performed. If a purge of the DNS cache 114 is allowed, the process 200' can include purging the DNS cache based on suitable purge configurations at stage 208'. For example, in one embodiment, the purge configuration may indicate that only certain types of resource records 116 (FIG. 1) can be purged. As such, only resource records of the indicated types are purged at stage 208'. Other examples of conditional purging are described above with reference to FIG. 1.

Figure 6:
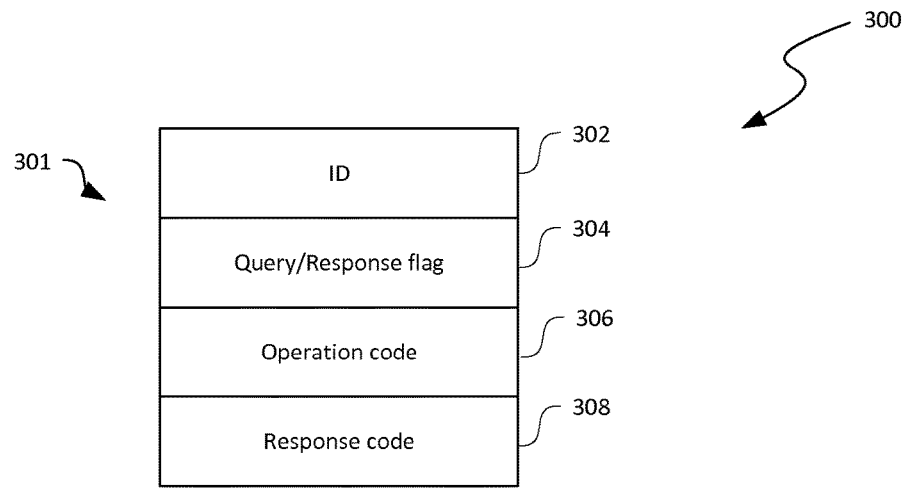
FIG. 6 is a schematic diagram illustrating an example data structure suitable for a DNS query or DNS response of FIG. 1 in accordance with embodiments of the disclosed technology.

FIG. 6 is a schematic diagram illustrating an example data structure 300 suitable for a DNS query or DNS response of FIG. 1 in accordance with embodiments of the disclosed technology. As shown in FIG. 6, the data structure 300 can include a stack with a plurality of data fields 301. In other embodiments, the data structure 300 can also be organized as a queue, an array, and/or other suitable structures. In the illustrated embodiment, the data fields 301 includes an ID field 302, a query/response flag field 304, an operation code field 306, and a response code field 308. The ID field 302 can contain identifier data (e.g., 16-bit) that identifies a client device 102 (FIG. 1) or other suitable devices that generated the DNS query. The query/response flag field can contain a value (e.g., 1 or 0) that indicates if the data structure 300 is a DNS query or DNS response.

The operation code field 306 can contain a value that indicates a target type of query or operation. For example, a value of 0 can indicate a standard query. A value of 2 can indicate a reverse query. A value of 2 can indicate a request for status of a caching server 112 (FIG. 1). A value of 6 can indicate a request to purge a part or all of the cached resource records 116 (FIG. 1) from the DNS cache 114 (FIG. 1) of the caching server 112.

The response code field 308 can contain a value that indicates a type of response to a DNS query. For example, a value of 0 can indicate that no error has occurred. A value of 1 can indicate a success in purging cached resource records 116 from the DNS cache 114 of the caching server 112. A value of 2 can indicate a failure in purging cached resource records 116 from the DNS cache 114 of the caching server 112. A value of 3 can indicate that purging cached resource records 116 from the DNS cache 114 of the caching server 112 is not allowed.

Even though particular example values are used above to illustrate various embodiments of the data structure 300, in other embodiments, any other suitable values may also be used. In further embodiments, the data structure 300 can also include additional and/or different fields 301. For example, in certain embodiments, the data structure 300 can also include a recursion desired field, a question count field, an answer record count field, and/or other suitable fields.

Figure 7:
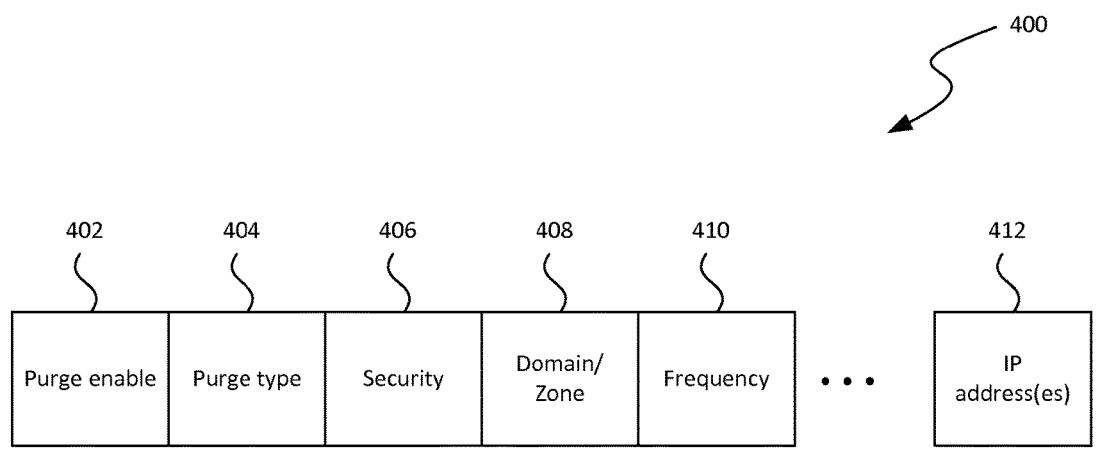
FIG. 7 is an example data schema suitable for the purge record of FIG. 1 in accordance with embodiments of the disclosed technology.

FIG. 7 is an example data schema 400 suitable for the purge record of FIG. 1 in accordance with embodiments of the disclosed technology. As shown in FIG. 7, the data schema 400 can include a purge enable field 402, a purge type field 404, a security field 406, a domain/zone field 408, a frequency field 410, and an IP address field 412. In other embodiments, the data schema 400 can include additional, less, and/or different fields.

The purge enable field 402 can contain data indicating whether purging cached resource records 116 (FIG. 1) from the DNS cache 114 (FIG. 1) of the caching server 112 (FIG. 1) is allowed. The purge type field 404 can indicate which type (e.g., A, AAAA, MX, NS, etc.) of resource records 116 may be purged. The security field 406 can contain data indicating a configured security mechanism (e.g., MD5 hashing) as well as security data (MD5 hash codes). The domain/zone field 408 can contain data indicating which domain(s) or zone(s) of domains whose resource records 116 may be purged. The frequency field 410 can contain data indicating how often resource records 116 may be purged. The IP address field 412 can contain data indicating IP address(es) from which purge queries may be allowed.

Figure 8:
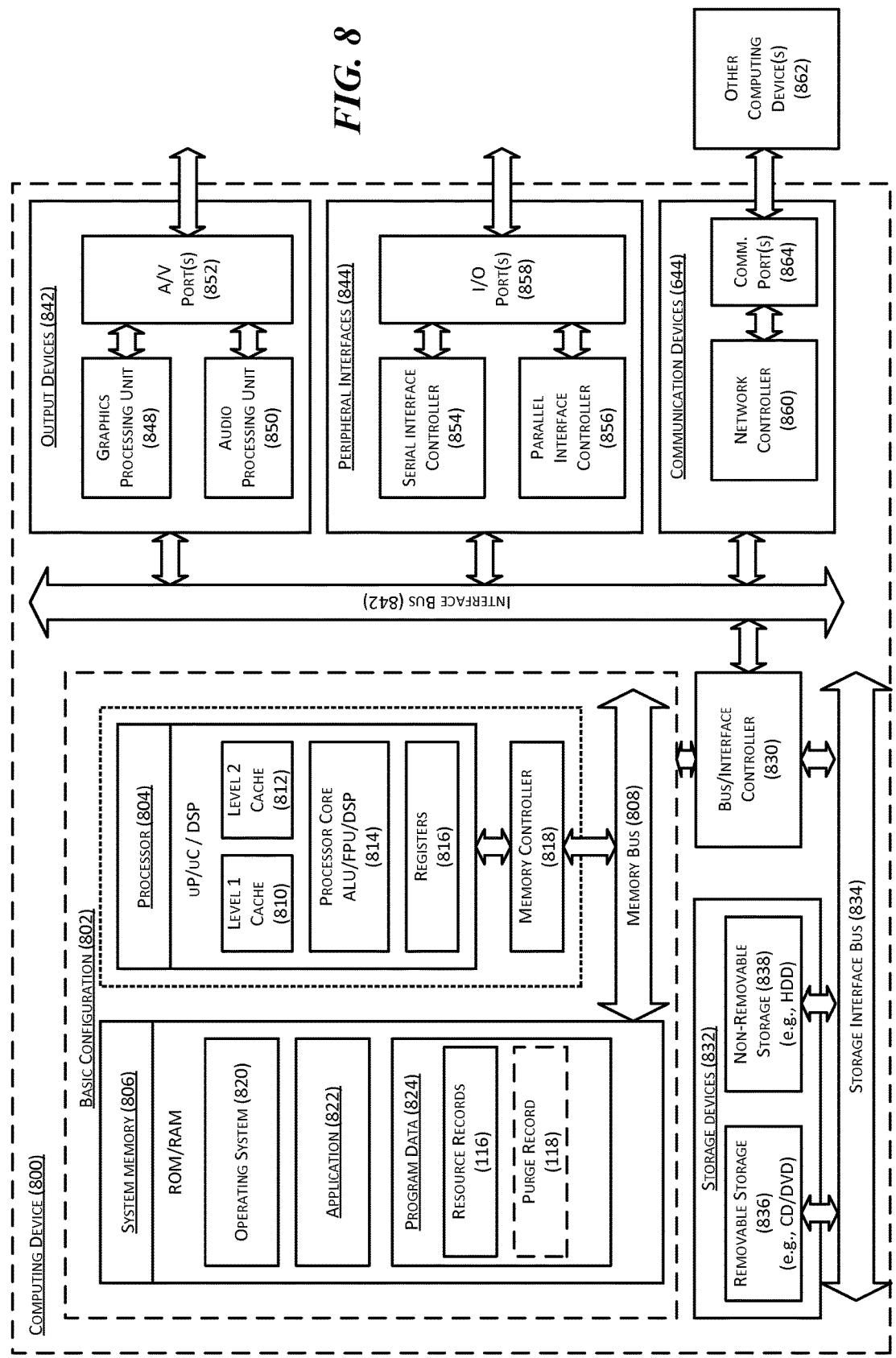
FIG. 8 is a computing device suitable for certain components of the computing framework in FIG. 1.

FIG. 8 is a computing device 800 suitable for certain components of the computing framework 100 in FIG. 1. For example, the computing device 800 may be suitable for the client device 102, the caching server 112, or one of the authoritative servers 130 of FIG. 1. In a very basic configuration 802, computing device 800 typically includes one or more processors 804 and a system memory 806. A memory bus 808 may be used for communicating between processor 804 and system memory 806.

Depending on the desired configuration, the processor 804 may be of any type including but not limited to a microprocessor (μP), a microcontroller (μC), a digital signal processor (DSP), or any combination thereof. The processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, one or more applications 822, and program data 824. The program data 824 may include, for example, the resource records 116 and optional purge record 118. This described basic configuration 802 is illustrated in FIG. 8 by those components within the inner dashed line.

The computing device 800 may have additional features or functionality, and additional interfaces to facilitate communications between basic configuration 802 and any other devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, removable storage devices 836, and non-removable storage devices 838 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 800. Any such computer readable storage media may be a part of computing device 800. The term "computer readable storage medium" excludes propagated signals and communication media.

The computing device 800 may also include an interface bus 840 for facilitating communication from various interface devices (e.g., output devices 842, peripheral interfaces 844, and communication devices 846) to the basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A method performed by a caching server in a domain name system ("DNS"), the caching server having a DNS cache storing one or more resource records previously retrieved from an authoritative server and a purge record configured to specify whether purging of one or more resource records from the DNS cache on the caching server is enabled, the method comprising:
   receiving, at the caching server, a DNS query from a client device or the authoritative server via a computer network; and
   in response to receiving the DNS query,
      determining whether the received DNS query includes a flag parameter having a value indicating that the DNS query is a request to purge a resource record stored in the DNS cache on the caching server; and
      in response to determining that the received DNS query is a request to purge a resource record stored in the DNS cache on the caching server,
         retrieving the purge record from the DNS cache on the caching server;
         determining whether the purge record indicates that purging of the resource record included in the DNS query from the DNS cache on the caching server is enabled; and
         in response to determining that purging of the resource record included in the DNS query from the DNS cache on the caching server is enabled, purging the resource record from the DNS cache on the caching server.

2. The method of claim 1, further comprising subsequent to purging the resource record from the DNS cache on the caching server, recursively retrieving a new copy of the purged resource record from the authoritative server.

3. The method of claim 1, further comprising:
   in response to determining that purging of the resource record from the DNS cache on the caching server is not enabled,
      maintaining the resource record in the DNS cache on the caching server; and
      transmitting a DNS response via the computer network, the DNS response indicating that the requested purge of the resource record stored in the DNS cache on the caching server is rejected.

4. The method of claim 1 wherein the DNS query contains data representing a domain name of resource records to be purged and a class of resource records to be purged, and wherein purging the resource record includes only purging the resource record of the class corresponding to the domain name from the DNS cache on the caching server.

5. The method of claim 1 wherein:
   in response to determining that purging of the resource record from the DNS cache on the caching server is enabled, determining if the received DNS query satisfies a security condition on the caching server; and in response to determining that the received DNS query satisfies a security condition on the caching server, purging the resource record from the DNS cache on the caching server.

6. The method of claim 1 wherein:
in response to determining that purging of the resource record from the DNS cache on the caching server is enabled, determining if the received DNS query is generated from a predetermined network address; and
in response to determining that the received DNS query is generated from a predetermined network address, purging the resource record from the DNS cache on the caching server.

7. The method of claim 1 wherein the caching server is a first caching server, and wherein the method further includes:
in response to determining that the received DNS query indicates a request to purge the resource record stored in the DNS cache on the first caching server,
generating another DNS query indicating a request to purge one or more resource records stored in a DNS cache on a second caching server; and
transmitting the generated another DNS query to the second caching server.

8. A caching server in a domain name system ("DNS"), comprising:
a processor and a memory operatively coupled to the processor, the memory containing a DNS cache storing one or more resource records previously retrieved from an authoritative server and a purge record configured to specify whether purging of one or more resource records from the DNS cache on the caching server is enabled, wherein the memory further contains instructions executable by the processor to cause the processor to:
receive a DNS query from a client device or the authoritative server via a computer network, the DNS query including a request to purge one or more resource records from the DNS cache of the caching server; and
in response to receiving the DNS query from the client device or the authoritative server,
retrieve the purge record from the DNS cache on the caching server;
determine whether the purge record indicates that purging of the resource record from the DNS cache on the caching server is enabled; and
in response to determining that purging of the resource record from the DNS cache on the caching server is enabled, purge the resource record from the DNS cache on the caching server.

9. The caching server of claim 8 wherein the memory contains additional instructions that are executable by the processor to cause the processor to:
in response to determining that purging of the resource record from the DNS cache on the caching server is not enabled,
maintain the resource record in the DNS cache on the caching server; and
transmit a DNS response via the computer network, the DNS response indicating that the requested purge of the resource record stored in the DNS cache on the caching server is rejected.

10. The caching server of claim 8 wherein the memory contains additional instructions that are executable by the processor to cause the processor to:

in response to determining that purging of the resource record from the DNS cache on the caching server is enabled, determine if the received DNS query satisfies a security condition on the caching server; and
in response to determining that the received DNS query satisfies a security condition on the caching server, purge the resource record from the DNS cache on the caching server.

11. The caching server of claim 8 wherein the memory contains additional instructions that are executable by the processor to cause the processor to:
in response to determining that purging of the resource record from the DNS cache on the caching server is enabled, determine if the received DNS query is generated from a predetermined network address; and
in response to determining that the received DNS query is generated from a predetermined network address, purge the resource record from the DNS cache on the caching server.

12. A caching server in a domain name system ("DNS"), comprising:
a processor;
a cache storing one or more resource records previously retrieved from an authoritative server and a purge record configured to specify whether purging of one or more resource records from the cache on the caching server is enabled; and
a memory containing instructions executable by the processor to cause the caching server to:
receive a DNS query from a client device or the authoritative server via a computer network; and
in response to receiving the DNS query,
determine whether the received DNS query includes a flag parameter having a value indicating that the DNS query is a request to purge a resource record stored in the cache of the caching server; and
in response to determining that the received DNS query is a request to purge a resource record stored in the cache of the caching server, retrieve the purge record from the cache of the caching server;
determine whether the purge record indicates that purging of the resource record from the cache of the caching server is enabled; and
in response to determining that purging of the resource record from the cache on the caching server is enabled, purge the resource record from the cache of the caching server.

13. The caching server of claim 12 wherein the memory contains additional instructions executable by the processor to cause the caching server to recursively retrieve a new copy of the purged resource record from the authoritative server subsequent to purging the resource record from the cache of the caching server.

14. The caching server of claim 12 wherein the memory contains additional instructions executable by the processor to cause the caching server to:
in response to determining that purging of the resource record from the cache of the caching server is not enabled,
maintain the resource record in the cache of the caching server; and
transmit a DNS response via the computer network, the DNS response indicating that the requested purge of the resource record stored in the cache of the caching server is rejected.

15. The caching server of claim 12 wherein the DNS query contains data representing a domain name of resource records to be purged and a class of resource records to be purged, and wherein to purge the resource record includes only to purge the resource record of the class corresponding to the domain name from the cache of the caching server.

16. The caching server of claim 12 wherein the memory contains additional instructions executable by the processor to cause the caching server to:
   in response to determining that purging of the resource record from the cache of the caching server is enabled, determine whether the received DNS query satisfies a security condition on the caching server; and
   in response to determining that the received DNS query satisfies a security condition on the caching server, allow purging of the resource record from the cache of the caching server.

17. The caching server of claim 12 wherein the memory contains additional instructions executable by the processor to cause the caching server to:
   in response to determining that purging of the resource record from the cache of the caching server is enabled, determine whether the received DNS query is generated from a predetermined network address; and
   in response to determining that the received DNS query is generated from a predetermined network address, allow purging of the resource record from the cache of the caching server.

18. The caching server of claim 12 wherein the memory contains additional instructions executable by the processor to cause the caching server to:
   in response to determining that the received DNS query is a request to purge a resource record stored in the cache of the caching server,
      generate another DNS query indicating a request to purge one or more resource records stored in another cache on another caching server; and
      transmit the generated another DNS query to the another caching server.

19. The caching server of claim 12 wherein the memory contains additional instructions executable by the processor to cause the caching server to:
   in response to determining that the received DNS query is a request to purge a resource, determine whether the caching server is configured for purging the one or more resource records stored in the cache of the caching server; and
   in response to determining that the caching server is configured for purging the one or more resource records stored in the cache of the caching server, allow purging of the one or more resource records from the cache of the caching server.

20. The caching server of claim 12 wherein the memory contains additional instructions executable by the processor to cause the caching server to:
   in response to determining that the received DNS query is a request to purge a resource, determine whether the caching server is configured for purging the one or more resource records stored in the cache of the caching server; and
   in response to determining that the caching server is not configured for purging the one or more resource records stored in the cache of the caching server,
      maintain the one or more resource records in the cache of the caching server; and
      transmit a DNS response via the computer network, the DNS response indicating that the requested purge of the one or more resource records stored in the cache of the caching server is rejected.

* * * * *